United States Patent
Nelson et al.

(10) Patent No.: US 11,915,134 B2
(45) Date of Patent: *Feb. 27, 2024

(54) PROCESSING CELL IMAGES USING NEURAL NETWORKS

(71) Applicant: Google LLC, Mountain View, CA (US)

(72) Inventors: Philip Charles Nelson, San Jose, CA (US); Eric Martin Christiansen, Carlsbad, CA (US); Marc Berndl, Mountain View, CA (US); Michael Frumkin, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,089

(22) Filed: Sep. 12, 2022

(65) Prior Publication Data
US 2023/0114552 A1 Apr. 13, 2023

Related U.S. Application Data

(63) Continuation of application No. 16/905,714, filed on Jun. 18, 2020, now Pat. No. 11,443,190, which is a
(Continued)

(51) Int. Cl.
*G06N 3/08* (2023.01)
*G06N 3/045* (2023.01)
(Continued)

(52) U.S. Cl.
CPC ............. *G06N 3/08* (2013.01); *G06N 3/045* (2023.01); *G06T 7/60* (2013.01); *G06V 20/69* (2022.01);
(Continued)

(58) Field of Classification Search
CPC .......... G06V 20/69; G06N 3/045; G06N 3/02; G06N 3/08; G06T 7/60; G06T 2207/20084
See application file for complete search history.

(56) References Cited

U.S. PATENT DOCUMENTS 6,463,438 B1 * 10/2002 Veltri .................. G06V 20/695
706/15
7,369,696 B2 * 5/2008 Arini .................. G01N 21/6452
382/128
(Continued)

FOREIGN PATENT DOCUMENTS

| CN | 1553166 | 12/2004 |
| CN | 1746901 | 3/2006 |

(Continued)

OTHER PUBLICATIONS

CN Office Action in Chinese Application No. 201680083751.1, dated Mar. 11, 2021, 30 pages (with English translation).
(Continued)

*Primary Examiner* — Shefali D Goradia
(74) *Attorney, Agent, or Firm* — Fish & Richardson P.C.

(57) ABSTRACT

Methods, systems, and apparatus, including computer programs encoded on computer storage media, for processing cell images using neural networks. One of the methods includes obtaining data comprising an input image of one or more biological cells illuminated with an optical microscopy technique; processing the data using a stained cell neural network; and processing the one or more stained cell images using a cell characteristic neural network, wherein the cell characteristic neural network has been configured through training to receive the one or more stained cell images and to process the one or more stained cell images to generate a cell characteristic output that characterizes features of the biological cells that are stained in the one or more stained cell images.

20 Claims, 4 Drawing Sheets

Related U.S. Application Data continuation of application No. 15/979,104, filed on May 14, 2018, now Pat. No. 10,692,001, which is a continuation of application No. 15/055,446, filed on Feb. 26, 2016, now Pat. No. 9,971,966.

(51) Int. Cl.
  *G06T 7/60* (2017.01)
  *G06V 20/69* (2022.01)
  *G06N 3/02* (2006.01)

(52) U.S. Cl.
  CPC ...... *G06N 3/02* (2013.01); *G06T 2207/20084* (2013.01)

(56) References Cited

U.S. PATENT DOCUMENTS

| | | | |
|---|---|---|---|
| 7,756,305 | B2 | 7/2010 | Price |
| 9,152,861 | B2 | 10/2015 | Ishiyama |
| 10,303,979 | B2 | 5/2019 | Kraus |
| 2002/0123977 | A1 | 9/2002 | Raz |
| 2002/0164063 | A1 | 11/2002 | Heckman |
| 2006/0257013 | A1* | 11/2006 | Ramm ............... G06T 7/0012 382/133 |
| 2008/0015448 | A1 | 1/2008 | Keely et al. |
| 2011/0256631 | A1 | 10/2011 | Tomaney |
| 2014/0270457 | A1* | 9/2014 | Bhargava ............ G06V 20/69 382/133 |
| 2017/0169567 | A1 | 6/2017 | Chefd'hotel |
| 2018/0137338 | A1 | 5/2018 | Kraus |

FOREIGN PATENT DOCUMENTS

| | | |
|---|---|---|
| CN | 102359938 | 2/2012 |
| CN | 102565316 | 7/2012 |
| CN | 103020639 | 4/2013 |
| CN | 103345654 | 10/2013 |
| CN | 103366180 | 10/2013 |
| CN | 103679184 | 3/2014 |
| CN | 103745210 | 4/2014 |
| CN | 105354565 | 2/2016 |
| WO | WO 2007/0121454 | 10/2007 |
| WO | WO 2015/195609 | 12/2015 |

OTHER PUBLICATIONS

EP Office Action in European Application No. 16825981, dated Apr. 16, 2020, 6 pages.
EP Office Action in European Application No. 16825981.0, dated Oct. 1, 2021, 5 pages.
International Search Report and Written Opinion in International Application No. PCT/US2016/068356, dated Mar. 17, 2017, 15 pages.
Mayerich et al. "Stain-less staining for computed histopathology," Technology, 3(1), Mar. 2015, 11 pages.
Nelson "Active Machine Learning, NIH Workshop: Parkinson's Disease Genetics and Systems Biology," June 5/6, 2014, 25 pages.
Noh et al., "Learning Deconvolution Network for Semantic Segmentation," (May 17, 2015) [online] (retrieved from http://arxiv.org/abs/1505.04366), 10 pages.
Summons to Attend Oral Proceedings in European Appln. No. 168259811.0, dated Sep. 7, 2023, 8 pages.

* cited by examiner

PROCESSING CELL IMAGES USING NEURAL NETWORKS

CROSS-REFERENCE TO RELATED APPLICATIONS

This application is a continuation of and claims priority to U.S. patent application Ser. No. 16/905,714, filed on Jun. 18, 2020, which is a continuation of U.S. application Ser. No. 15/979,104, filed on May 14, 2018 (now U.S. Pat. No. 10,692,001), which is a continuation of U.S. patent application Ser. No. 15/055,446, which was filed on Feb. 26, 2016 (now U.S. Pat. No. 9,971,966). The disclosures of the prior applications are considered part of and are incorporated by reference in the disclosure of this application.

BACKGROUND

This specification relates to a neural network for processing images of biological cells.

Neural networks are machine learning models that employ one or more layers of models to generate an output, e.g., one or more classifications, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Existing methods of processing cells include manually washing the cells with fluorescent markers to generate stained cells. From the stained cells, scientists can manually identify characteristics of the cells.

SUMMARY

In general, this specification describes a neural network for processing cell images.

In particular, a system obtains data that includes an input image of one or more biological cells illuminated with an optical microscopy technique.

The system processes the data using a stained cell neural network. The stained cell neural network is a deep neural network that has been configured through training to receive the data and to process the data to generate one or more stained cell images. Each stained cell image depicts a respective stained version of the one or more biological cells in the input image.

Particular embodiments of the subject matter described in this specification can be implemented so as to realize one or more of the following advantages.

A stained cell neural network can predict a stained cell image from an image of a cell and a cell characteristic neural network can predict characteristics of the cell from the stained cell image. Therefore, characteristics of the cell can be predicted from the image of the cell using automated processes, which can reduce cost and testing time. That is, the characteristics of the cell can be predicted without having to physically stain a live cell, which reduces the number of live cells that need to be modified to determine the characteristics of the cell. In particular, a stained image of a live cell can be generated without physically staining and possibly killing the cell. These stained images can then be used to determine characteristics of the cell. Additionally, generating stained images using a neural network is more efficient and requires fewer resources and less time than physically staining a cell to generate a stained image. Moreover, the neural network can be configured to stain for any number of channels simultaneously, whereas physical protocols can only stain for a small number of channels simultaneously.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
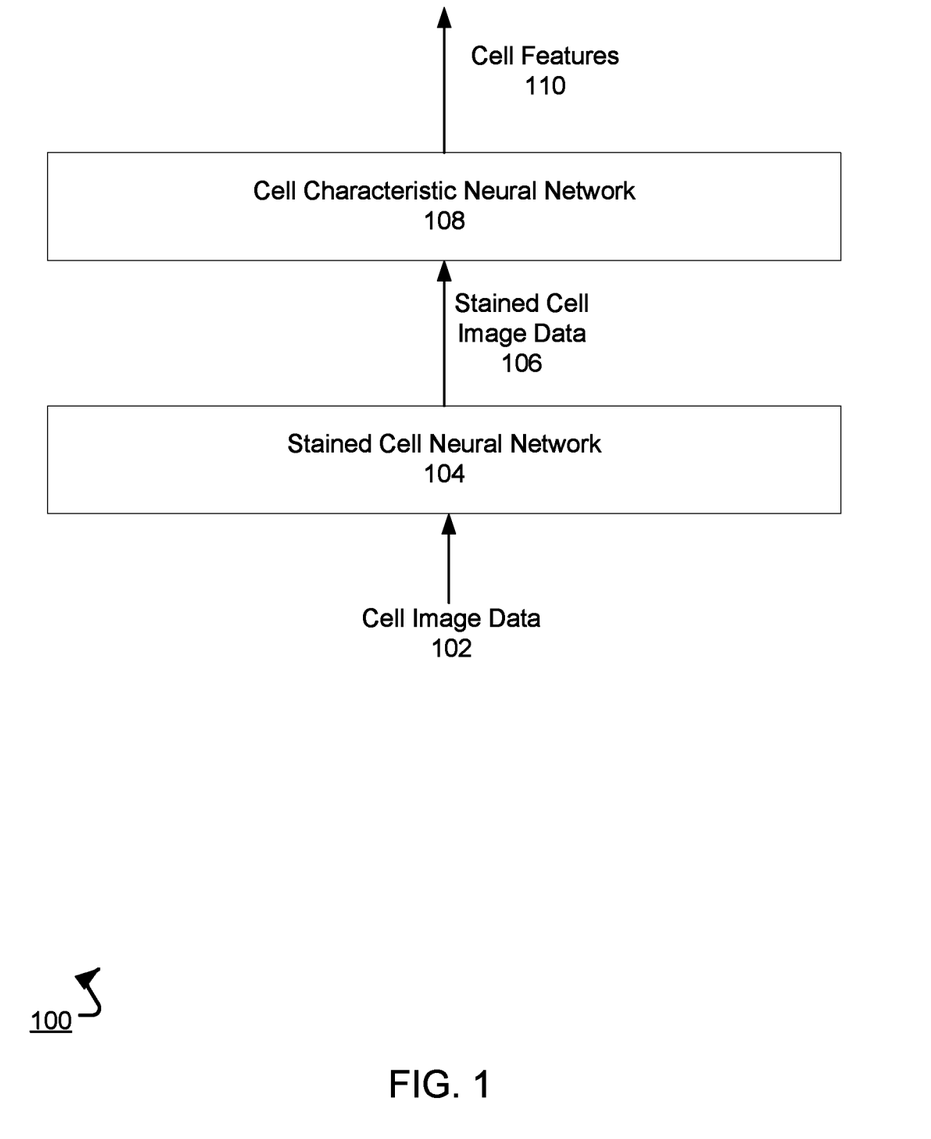
FIG. 1 illustrates an example system for processing cell images.

FIG. 1 illustrates an example system 100 for processing cell images. The system 100 is an example of a system implemented as computer programs on one or more computers in one or more locations, in which the systems, components, and techniques described below can be implemented.

The system 100 includes a stained cell neural network 104. The stained cell neural network 104 is a neural network that is configured to process cell image data 102 to generate stained cell image data 106. The cell image data 102 can include one or more images of one or more biological cells taken by a microscopic camera. The stained cell image data 106 includes images predicting what the cells in the cell image data 102 would look like if the cells were stained.

Cell staining is a technique that is used to visualize biological cells, e.g., using a microscope, by applying a stain to the cells. After application, different stains can cause various components of the cells to display visual markers, e.g., to change color from their original color to a different color. Example components of a cell which may display visual markers due to the cell being stained with a particular stain include the nucleus or the cell membranes of the cell. Some cell staining techniques are performed on living cells while other staining techniques can be performed on non-living cells. For example, one cell staining technique is to immerse a sample of cells in a dye solution and then to rinse and capture an image of the sample under a microscope. After staining the cells, scientists can visually analyze the cells or the stained images of the cells to determine characteristics of the cells.

In some implementations, the stained cell neural network 104 is trained to generate multiple types of stained cell images from a given input cell image. Each stained cell image corresponds to a different type of stain. For example, predicted stain images can be of stains generated using in vivo staining or in vitro staining. By way of illustration, one stained cell image can be a predicted image of the one or more cells being stained with a crystal violet stain. Other stained cell images can be of various fluorescent channels of the cell image.

In particular, the stained cell neural network 104 receives, as input, data including pixels of a cell image. When generating a stained image, the stained cell neural network 104 generates, for each input pixel of the cell image, a respective output pixel. The output pixels for each cell image form a respective stained cell image. Thus, the stained cell neural network 104 can implement a fully convolutional image-to-image regression. An example neural network architecture that can be used for the stained cell neural network 104 is described in "Learning Deconvolution Network for Semantic Segmentation," Hyeonwoo Noh, Seunghoon Hong, and Bohyung Han, accessible at http://arxiv.org/abs/1505.04366.

The system 100 also includes a cell characteristic neural network 108. The cell characteristic neural network 108 is configured to process stained cell image data 106 generated by the stained cell neural network 104 to generate cell features 110 of the one or more cells in the cell image data 102. The cell features 110 characterize features of the one or more cells in the cell image data 102. For example, the cell features 110 can indicate one or more of: a cell type, health, provenance or condition, state of differentiation in induced pluripotent stem cell protocols, or a count of the cells. For example, for each input image, the cell characteristic neural network 108 can generate a feature vector of outputs, with each feature corresponding to a respective portion of the outputs in the feature vector.

To configure the neural networks 104 and 108 to generate the stained cell image data 106 and the cell features 110, the system 100 can train the neural networks 104 and 108 on training data, which will be described further below with reference to FIGS. 3 and 4.

Figure 2:
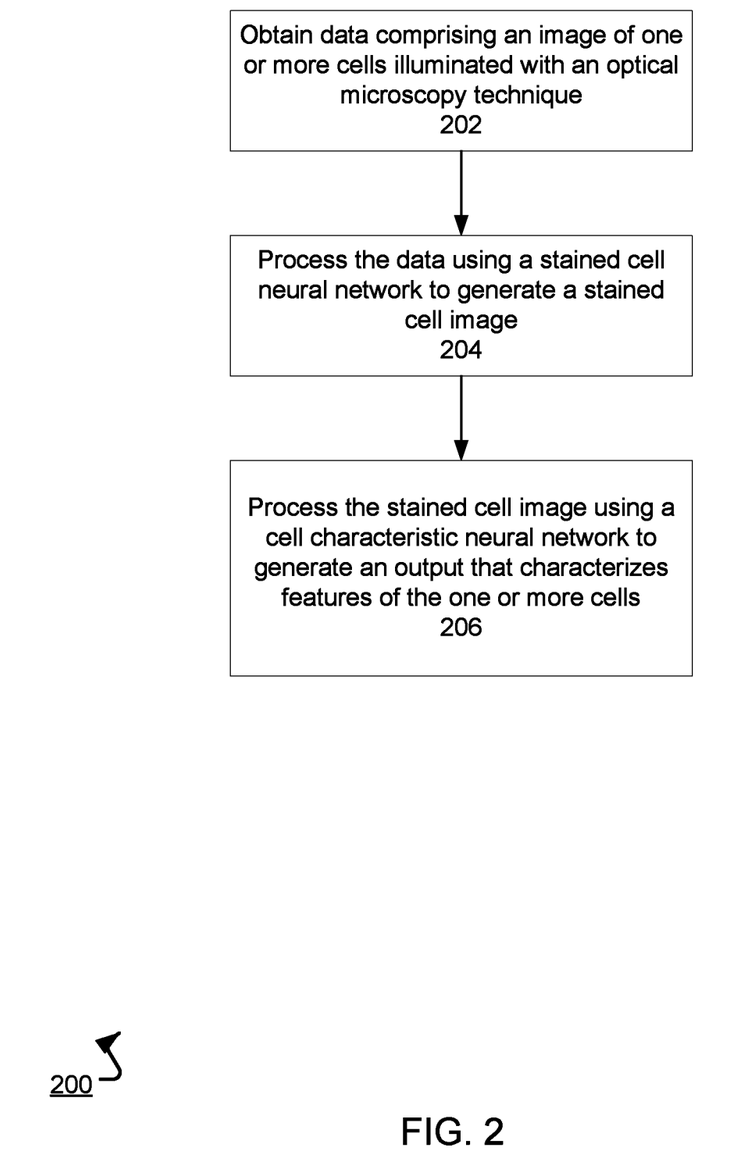
FIG. 2 is a flow diagram of an example process for processing an image of one or more cells to identify features of the one or more cells.

FIG. 2 is a flow diagram of an example process 200 for processing an image of one or more cells to identify features of the one or more cells. For convenience, the process 200 will be described with respect to a system, e.g., the system 100 of FIG. 1, having one or more computing devices that execute software to implement the process 200.

The system obtains data including one or more images of one or more cells illuminated with an optical microscopy technique (step 202).

For example, in the one or more images, the cells can be illuminated by differential interference contrast microscopy, red light microscopy, or ultraviolet light microscopy. In some implementations, each image of the one or more cells is foveated. In some implementations, the data includes multiple images, each illuminated by a different microscopy technique.

In some implementations, the data includes a set of images of varying focus. That is, each image focuses at a different depth point of the one or more cells, and the different depth points in the set of images span the entire structure of the one or more cells. The images can be taken by a high resolution camera.

The system processes the data using a stained cell neural network, e.g., the stained cell neural network 104 of FIG. 1, to generate one or more stained cell images (step 204).

The stained cell neural network is a neural network that has been configured through training to receive data including one or more images of one or more cells and to process the one or more images to generate one or more stained cell images. Training the stained cell neural network will be described further below with reference to FIG. 3.

In implementations where the data includes a set of images of varying focus, the neural network includes multiple independent towers of neural network layers, an intermediate combining layer that combines the output of each tower to generate a combined output, and one or more additional neural network layers that process the combined output to generate the stained cell images. In these implementations, the system groups the set of images into multiple image groups, with each group corresponding to a respective one of the towers. The system then processes each group using the corresponding tower. In some cases, each group includes a single image from the set of input images. In some other cases, one or more of the groups can include multiple images, with the input to the corresponding tower being a multi-dimensional tensor, e.g., a stack of the images in the group.

The system processes the one or more stained cell images using a cell characteristic neural network, e.g., the cell characteristic neural network 108 of FIG. 1, to generate an output that characterizes features of the one or more cells (step 206).

The cell characteristic neural network is a neural network that has been configured through training to receive one or more stained cell images that depict what one or more cells would look like if stained and to generate an output that characterizes features of the one or more cells that are depicted in the stained cell images.

For example, the cell characteristic neural network may be configured to output a feature vector that includes multiple output values. Each feature that the neural network is configured to characterize can correspond to a respective portion of the output values in the feature vector. For example, the features can indicate one or more of: a cell type, health, provenance or condition, state of differentiation in induced pluripotent stem cell protocols, or a count of the cells. As one example, a predetermined one of the output values in the feature vector can represent a predicted count of the number of cells in the input image while the portion that corresponds to the cell type feature can include multiple values that each correspond to a respective type of cell. The value that corresponds to a given cell type may represent a likelihood that the cells in the image are of that type.

Training the cell characteristic neural network will be described further below with reference to FIG. 4.

Figure 3:
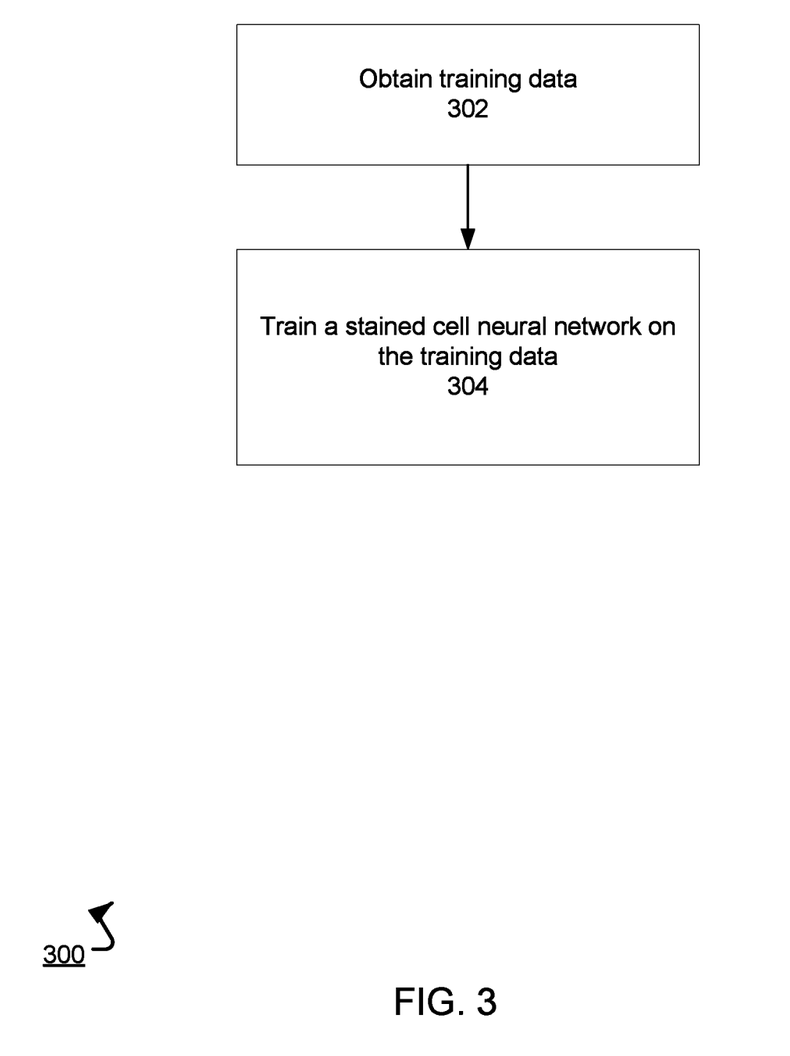
FIG. 3 is a flow diagram of an example process for training a stained cell neural network.

FIG. 3 is a flow diagram of an example process 300 for training a stained cell neural network. For convenience, the process 300 will be described with respect to a system, e.g., the system 100 of FIG. 1, having one or more computing devices that execute software to implement the process 300.

The system obtains training data for the stained cell neural network (step 302). The training data includes multiple training examples, with each training example including one or more images of one or more cells, and, for each training example, one or more corresponding stained images. In some cases, for each training example, the corresponding stained images can depict the cells being stained with a variety of stains.

The system trains the stained cell neural network on the training data (step 304). To train the stained cell neural network, the system processes the image in each training example using the stained cell neural network to generate one or more stained cell images. Generally, each stained cell image corresponds to a different stain. The system then determines, for each pixel of each stained cell image, an error between the pixel values generated by the stained cell neural network and the pixel values in the corresponding stained cell image in the training data.

The system uses the error to update values of the parameters used in each layer of the stained cell neural network using conventional neural network training techniques, e.g., stochastic gradient descent with backpropagation.

Figure 4:
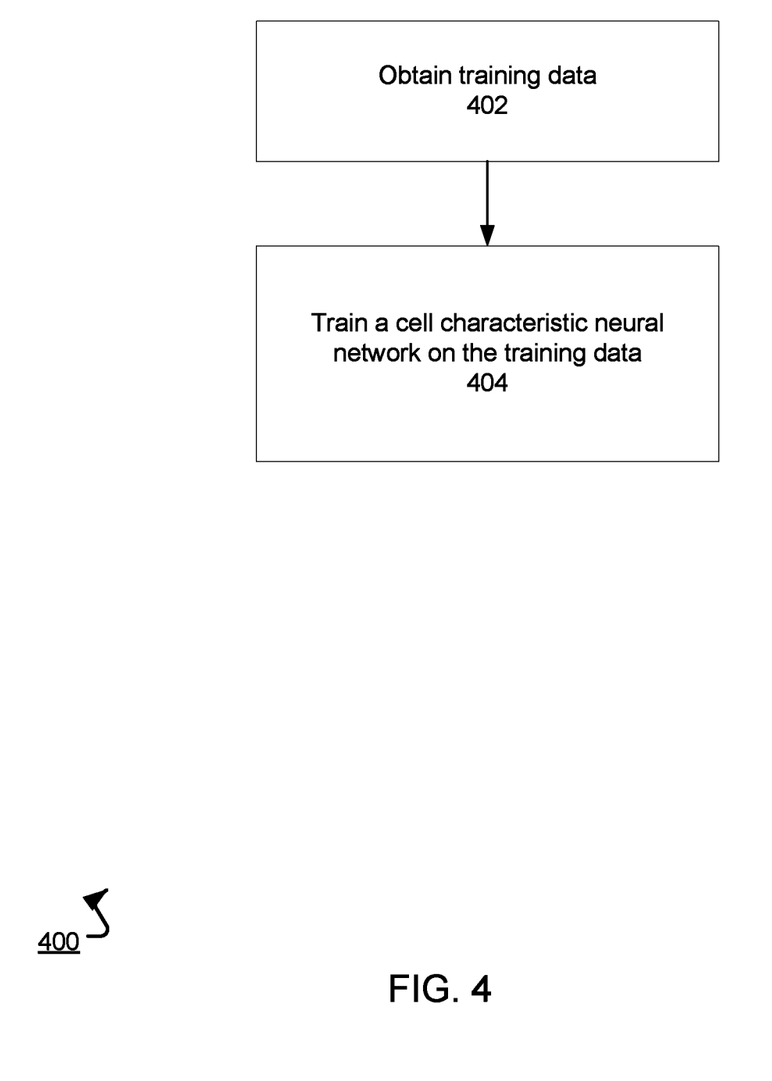
FIG. 4 is a flow diagram of an example process for training a cell characteristic neural network.

FIG. 4 is a flow diagram of an example process 400 for training a cell characteristic neural network. For convenience, the process 400 will be described with respect to a system, e.g., the system 100 of FIG. 1, having one or more computing devices that execute software to implement the process 400.

The system obtains training data for the cell characteristic neural network (step 402). The training data includes multiple training images, where each training example is an image of one or more stained cells, and for each training image, a corresponding feature vector. In particular, the corresponding feature vectors include outputs corresponding to each feature that the cell characteristic neural network is configured to predict.

In some implementations, the system receives training data that includes images of unstained cells and then processes the images using the trained stained cell neural network to generate the training images that will be used as training data for the cell characteristic neural network.

The system trains the cell characteristic neural network on the training data (step 404). That is, the system processes each training image using the cell characteristic neural network to determine a predicted feature vector for the training image. The system then determines an error between the predicted feature vector for the training image and the feature vector corresponding to the training image in the training data and uses the error to update values of the parameters used in each layer of the cell characteristic neural network using conventional neural network training techniques.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    training a neural network comprising one or more parameter values and that is configured to receive input data comprising one or more images of one or more biological cells, and to process respective pixels of the one or more images to predict one or more fluorescent channels of an output image of the one or more biological cells,
    wherein the training comprises:
        obtaining training data comprising one or more images of one or more biological cells and one or more stained images depicting the one or more biological cells, each stained image depicting the one or more biological cells according to a respective fluorescent channel of one or more fluorescent channels;
        processing the one or more images through the neural network to obtain one or more fluorescent channels of a predicted output image;
        determining an error between the one or more stained images and the one or more fluorescent channels of the predicted output image, comprising comparing a respective error between each pixel of each fluorescent channel of the predicted output image, with each corresponding pixel in a respective stained image corresponding to the fluorescent channel; and
        updating the one or more parameter values of the neural network according to the determined error.

2. The method of claim 1, wherein the one or more images of the training data are each of the one or more biological cells illuminated with a respective microscopy technique of one or more microscopy techniques.

3. The method of claim 2, wherein the one or more microscopy techniques include one or more of an optical microscopy technique, a hyperspectral microscopy technique, or a fluorescent microscopy technique.

4. The method of claim 2, wherein the one or more images of the training data have different focal points.

5. The method of claim 1, further comprising:
    processing input data comprising processing one or more second images of one or more second biological cells to predict, through the neural network, one or more fluorescent channels of an output image of the one or more second biological cells.

6. The method of claim 5, further comprising:
processing the output image of the one or more second biological cells using another neural network trained to generate a cell characteristic output that characterizes features of the one or more second biological cells in the output image.

7. The method of claim 6, wherein the cell characteristic output comprises data characterizing one or more of a cell type, a cell health, a cell population, a cell phenotype, or a cell state of differentiation in induced pluripotent stem cell protocols of the one or more second biological cells.

8. The method of claim 6, wherein the cell characteristic output specifies, from the one or more second biological cells, an average cell health or a percentage of cells that have correctly differentiated through induced pluripotent stem cell protocols.

9. The method of claim 6, wherein the cell characteristic output specifies a cell condition for each biological cell of the one or more second biological cells.

10. A system comprising:
one or more storage devices for storing data representing a neural network, and
one or more processors communicatively coupled to the one or more storage devices and configured to perform operations associated with the neural network, the operations comprising:
obtaining input data comprising one or more images of one or more biological cells, wherein each image is an image of the one or more biological cells illuminated with a respective microscopy technique of one or more microscopy techniques;
processing the input data comprising the one or more images using the neural network, wherein the neural network has been configured through training
to receive the input data comprising the one or more images of the one or more biological cells, and
to process respective pixels of the one or more images of the input data to predict one or more fluorescent channels of an output image of the one or more biological cells,
wherein each pixel in each of the one or more fluorescent channels generated by the neural network corresponds to a respective pixel of the one or more images; and
providing the output image with the one or more fluorescent channels.

11. The system of claim 10, wherein the system is operatively coupled to a microscopic camera, and wherein the operations further comprise generating the one or more images of the one or more biological cells using the microscopic camera.

12. The system of claim 11, wherein generating the one or more images of the one or more biological cells comprises generating the one or more images to have different focal points.

13. The system of claim 10, wherein the one or more microscopy techniques include one or more of an optical microscopy technique, a hyperspectral microscopy technique, or a fluorescent microscopy technique.

14. The system of claim 10, wherein the system is operatively coupled to a display device, and wherein providing the output image comprises providing the output image for display on the display device.

15. The system of claim 10, wherein the operations further comprise:
processing the output image using another neural network trained to generate a cell characteristic output that characterizes features of the one or more biological cells in the output image.

16. The system of claim 15, wherein the cell characteristic output comprises data characterizing one or more of a cell type, a cell health, a cell population, a cell phenotype, or a cell state of differentiation in induced pluripotent stem cell protocols of the one or more biological cells.

17. The system of claim 15, wherein the cell characteristic output specifies, from the one or more biological cells, an average cell health or a percentage of cells that have correctly differentiated through induced pluripotent stem cell protocols.

18. The system of claim 15, wherein the cell characteristic output specifies a cell condition for each biological cell of the one or more biological cells.

19. A system comprising:
one or more one or more computers and one or more storage devices storing instructions that when executed by the one or more computers cause the one or more computers to perform operations comprising:
training a neural network comprising one or more parameter values and that is configured to receive input data comprising one or more images of one or more biological cells, and to process respective pixels of the one or more images to predict one or more fluorescent channels of an output image of the one or more biological cells,
wherein the training comprises:
obtaining training data comprising one or more images of one or more biological cells and one or more stained images depicting the one or more biological cells, each stained image depicting the one or more biological cells according to a respective fluorescent channel of one or more fluorescent channels;
processing the one or more images through the neural network to obtain one or more fluorescent channels of a predicted output image;
determining an error between the one or more stained images and the one or more fluorescent channels of the predicted output image, comprising comparing a respective error between each pixel of each fluorescent channel of the predicted output image, with each corresponding pixel in a respective stained image corresponding to the fluorescent channel; and
updating the one or more parameter values of the neural network according to the determined error.

20. The system of claim 19, wherein the operations further comprise:
processing input data comprising one or more second images of one or more second biological cells through the neural network to predict one or more fluorescent channels of an output image of the one or more second biological cells.

* * * * *